2 Sheets—Sheet 1.
G. M. PETERS.
Fastening Attachment for Vehicle-Dashes.
No. 225,019. Patented Mar. 2, 1880.
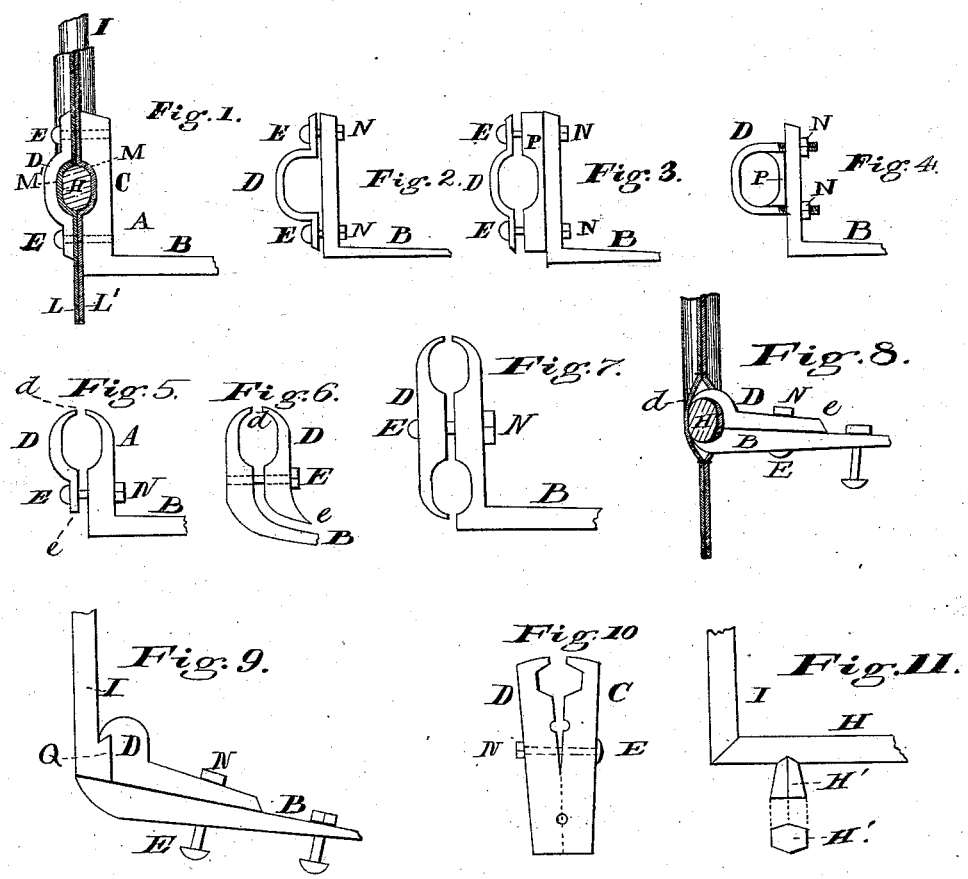
Attest:
M. S. Christopher
Jno. W. Strehli
Inventor:
George M. Peters,
per Wm. Hubbell Fisher,
Atty.

2 Sheets—Sheet 2.
G. M. PETERS.
Fastening Attachment for Vehicle-Dashes.
No. 225,019. Patented Mar. 2, 1880.
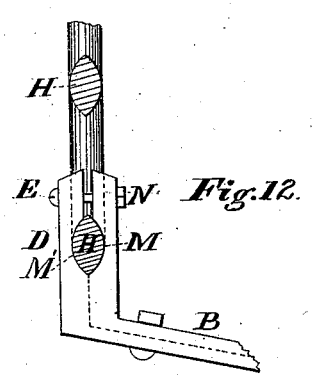
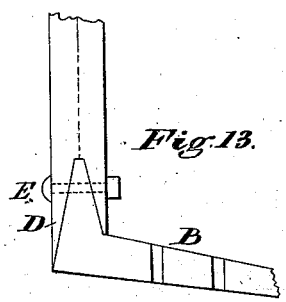
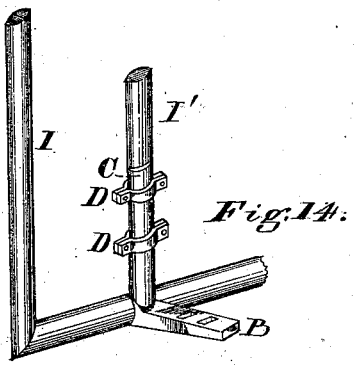
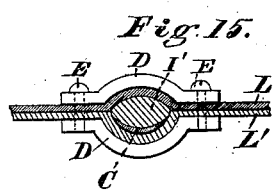
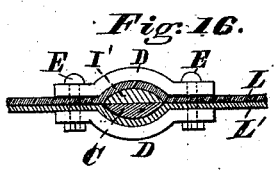
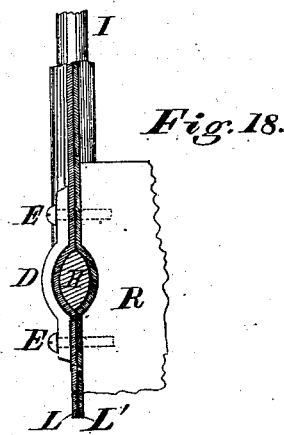
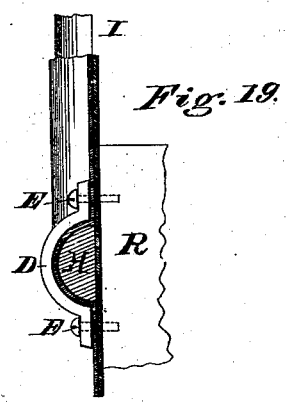
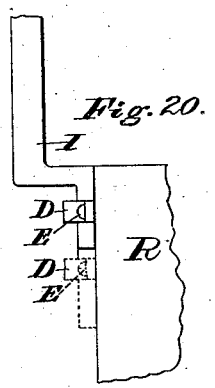
Attest:
W. S. Christopher
Jno. W. Strchli
Inventor:
George M. Peters,
per Wm. Hubbell Fisher,
Atty.

UNITED STATES PATENT OFFICE.

GEORGE M. PETERS, OF COLUMBUS, OHIO.

FASTENING ATTACHMENT FOR VEHICLE-DASHES.

SPECIFICATION forming part of Letters Patent No. 225,019, dated March 2, 1880.

Application filed June 17, 1878.

*To all whom it may concern:*

Be it known that I, GEORGE M. PETERS, of the city of Columbus, in the county of Franklin and State of Ohio, have invented certain new and useful Improvements in Devices for Attaching Dashes to Vehicles, of which the following is a specification.

My invention relates to that class of dashes which have a supporting metallic frame or frame-work composed of bars or rails suitably combined.

My invention consists, in general, in the combination of a dash-frame and a clip or clamp, substantially as hereinafter specified, applied, in conjunction with the vehicle, in such a manner as to connect the dash-frame to the vehicle, or when one or more feet or a connection equivalent to the latter are employed between the dash-frame and the body, then in the application to or combination with the said feet of the clip or clamp for securing the dash to the vehicle.

As the preferred forms of my invention can be attached to the dash either nearer to or farther from the ends thereof at pleasure, a convenient means is provided whereby a dash may be fitted to a vehicle of any width.

Another advantage is, that where feet are employed between the dash and vehicle the feet can first be attached to the vehicle while the latter is being constructed, and, if desired, be painted or finished up with the latter, and the dash then attached to said feet without injuring the surface of the dash. When the dash or either of the feet is broken, either can be readily removed, repaired, and replaced, or a new one substituted therefor. Where feet are not employed the vehicle-body can be finished without the dash, and the dash then attached thereto without disfiguring the vehicle body or dash. The dash can be readily removed, repaired, and replaced, or a new one substituted therefor.

One of the particular advantages of certain of the forms of my invention is, that they can be attached to a footless frame-dash manufactured without special provision for the attachment of any kind of foot or like device.

Some of the various devices embodying my invention are seen in the accompanying drawings, and may be grouped as follows:

First, where feet are employed to connect the dash to the vehicle and the foot is connected to the dash by means of a separable clip so arranged that a portion of the frame of the dash or an extension thereof is grasped between the clip and foot. Illustrations of this form of my invention are shown in Figures 1, 2, 3, 4, 5, 6, 7, 8, and 9, Sheet 1, of the accompanying drawings.

Secondly, where feet are employed to connect the dash to the vehicle and the foot is split either a portion or the whole of its length, and is connected to the frame of the dash or any extension thereof by the opposite split portions of the foot being caused to grasp between them the frame of the dash or an extension thereof. Illustrations of this form of my invention are seen in Figs. 10, 11, and 12, Sheets 1 and 2, of the accompanying drawings.

Thirdly, where feet are employed to connect the dash to the vehicle, and the dash frame or extension is split or divided wholly or partially, and the foot is connected to the dash by the opposite split portions of the dash-frame being made to grasp between them the foot or an extension thereof. Illustrations of this form of my invention are seen in Fig. 13, Sheet 2, of the accompanying drawings.

Fourthly, where feet are employed to connect the dash to the vehicle and a pair of clips or a clamp is employed to bind the feet to the frame of the dash or extension thereof. Illustrations of this form of my invention are seen in Figs. 14, 15, 16, and 17, Sheet 2, of the accompanying drawings.

Fifthly, where feet are dispensed with and the dash is connected directly to the vehicle by a clip or clamp so arranged as to bind or connect some portion of the frame of the dash or extension thereof to the said body. Illustrations of this form of my invention are seen in Figs. 18, 19, and 20, Sheet 2, of the accompanying drawings.

In Fig. 1, A indicates the dash-foot, consisting of foot B C, of which B is the part attached to the body, and C is an extension or shank recessed on the front side at M to receive one-half of the convexity of rod or bar H of the frame. A clip, D, formed so as to have a recess, M', to receive the other half of the convexity of the bar H, is also present. The rod H, as here shown, is the lower horizontal bar or rod of a dash-frame, the dash consisting of a metal frame of the common form—viz., of upright rods or bars at each end, as I, and lower and upper horizontal cross rods or bars united to the said uprights and covered with leather. The two thicknesses of leather L L' are in juxtaposition, except where the rods of the frame are present, and there they divide and pass around the bars or rods. They are here seen inclosing the upright rod I and also the horizontal rod H of the frame. The clip D is provided above and below recess M with bolt-holes, and extension C of the foot with female screws.

Ordinarily, before connecting the foot to the dash, the foot is first connected to the vehicle at the desired points by screws, bolts, or rivets passing through portion B of the foot and into the vehicle, the foot having been previously bent or shaped to fit the portion of the vehicle to which it is to be attached. The dash now being placed vertically and being brought against the extension C, so that one-half of the convexity of rod H fits into recess M, the clip is then fitted against the opposite side of the dash, so that the other half of the convexity of the rod H enters the recess M'. A screw, E, is then introduced through each hole in the clip, and through the leather L L', and, screwed into extension B, secures the clip firmly to the extension. The lower rod, H, is thus firmly grasped between the clip and extension C, and the dash is secured in position at the front of the vehicle.

Fig. 2 shows a clip and foot adapted to grasp a half-round rod.

Fig. 3 shows a clip bolted above and below the dash-rod, and shows a concave bearing, P, placed between the dash-rod and dash-foot proper and extended upwardly and downwardly, so that the bolts securing the clip in position pass through this concave bearing and keep it also in position. This bearing P is added to prevent the expense of cutting the groove in the foot, and also to preserve the strength of the latter.

Fig. 4 shows the clip in a horseshoe shape and with a screw-thread cut on each end. These ends pass through the foot and are secured in place by nuts.

Fig. 5 shows the clamp or clip secured to the foot by a bolt passing through the foot and that portion of the clip which bears against the latter.

Fig. 6 shows the clip located on the inner side of the foot and fastened by a screw having a square head. Where but one bolt is employed to secure the clip D to the foot, the extension or shoulder e on the side of the bolt E opposite from the concavity M is preferably of some length, as shown in Fig. 5, and still better in Figs. 6 and 8, so that the shoulder e, when the clip is screwed up toward the foot or vehicle-body, bears against the foot or body and acts as a fulcrum or lever to throw the opposite point, d, of the clip toward said foot or body and against the bar of the dash-frame or extension. When the bolt E securing the clip D to the foot, &c., is of a different piece from the clip, the part e may be termed an "extension," and when the bolt is in one piece with the clip the part e may be termed a "shoulder."

Fig. 7 shows a clip and foot for grasping two rods of the dash-frame, and its securing-bolt passes between the rods.

In relation to the device shown in Fig. 7, when preferred, a bearing-piece, (similar to that shown in Fig. 3,) provided with a concavity for each of the rods, may be interposed between the foot and rods of the dash and secured in place by the said securing-bolt, whereupon the concavities in the foot may be dispensed with.

Fig. 8 shows a horizontal foot and clip. They have sharp edges, and may be forced through the leather and grasp the rod H above and below, and are held together by one or more bolts.

Fig. 9 shows another horizontal foot and clip. They are held together by one or more bolts, and grasp a flange or an extension, Q, located on any preferred portion of the dash or extension thereof. This flange may run the whole length of the dash or for a short distance only near each end.

Figs. 10 and 11 show a foot split part way down and adapted to lie horizontally and grasp the wedge-shaped extension H' on the lower portion of the dash. This extension H' is preferably larger at the base than next to the dash, so as to prevent the dash working out of it and from rattling loose. When preferred this foot may be split its whole length in two pieces, as shown by the dotted lines. The opposite portions of this foot are caused to grasp the said extension H' by a bolt or bolts, E.

Fig. 12 shows a foot split for a portion of its length and grasping a rod or bar of the dash, or of an extension thereof, and which rod or bar is indicated by the letter H. The foot is preferably hollowed out in a circular, oval, or other shape to fit the particular shape of the portion of the dash-frame or extension to be held by the foot, and also to allow the foot to tightly encircle or surround the said portion of the dash-frame or extension, and at the same time permit the upper ends of the two split parts of the foot above said bar H to come into contact or near proximity to each other. The dash-frame or extension thereof is held rigidly in the opening or hole of the foot by the latter encircling a portion of said frame or extension. A set or clamping screw or bolt located at any suitable point along the front or rear of the foot causes or contributes to cause the foot to securely hold the bar H. When preferred the foot may be split throughout its whole length. The bolt through the upper end of this foot, when screwed up, clamps the foot tightly upon the dash. The lower ends of the halves of the foot are kept together in any suitable manner. When the sides of that portion of the frame of the dash or extension grasped by the foot are flat, the inner sides of the foot are likewise to be made flat, as shown by the dotted lines in said figure.

Fig. 13 shows a portion of the frame of the dash or extension thereof split or divided so as to receive one end of the foot. A securing-bolt, E, passes through these divided portions and the end of the foot, and when screwed up causes the divided portions to tightly clamp the foot. When preferred the dash-frame may be split vertically throughout its whole height. It may be split throughout its whole length or portions thereof.

Fig. 14 shows a foot whose upper end is against one of the rods of the dash, (preferably one of the uprights thereof,) and is secured to said rod by one or more pairs of clips or clamps, D. The foot and rod it lies against may be of any desired shape.

Figs. 15 and 16 are cross-sections of a foot thus secured to the rod, in which C is the foot, and I' the rod; L L, the leathers, and D D the clips, secured together by the bolts E passing through the dash at the sides of the foot C and bar I'. In Fig. 15 the rod I' is oval or round and the foot is sufficiently concave to conform to the shape of the rod I', while in Fig. 16 both the rod I' and foot are each in cross-section of the shape of the segment of a circle, the flat sides of each being next to each other.

The foot C, when employed in connection with a dash-frame covered on both sides with leather, will usually be outside of the leather of the dash, but when thin may be slipped up under the leather. This clip D is, when preferred, to be made in the form shown in Fig. 17, and when made of spring metal its elasticity can be made use of to hold the foot C and rod I' together, a bolt or screw, &c., being employed with the same.

Where, for any reason, it is desirable to attach the dash directly to the body of the vehicle without the intervention of a foot, the dash may be placed against the body, as shown in Figs. 18, 19, and 20, Sheet 2, or in nearness thereto, and held there by a clamp properly secured by bolts, &c.

Fig. 18 shows one-half of the concavity of the oval bar or rod of the dash or extension thereof fitted into the body R, and Fig. 19 shows this bar or rod as half round, with its flat side fitting up against the body R, said bar or rod in either case being secured to the body by the clip or clamp D, preferably provided, as shown, with the two bolts or screws. The position of the clip will preferably be horizontal or perpendicular, according as this rod or bar of the dash or extension thereof is perpendicular or horizontal.

It may be remarked that the size and shape of that portion or those portions of the clamp that embrace the frame of the dash or extension thereof will be varied to suit the particular conformation of that portion of the dash or extension which the clamp embraces.

When an extension of the dash is present and is the portion grasped by the clamp, it is immaterial how the extension is attached to the dash.

The extension may be cast with or forged to the dash or united thereto by bolts, rivets, screws, &c.

It may be stated here that the clamp may be inserted or placed under the leather in cases where the construction of it and of the dash admit thereof.

Any desirable means, as bolts, screws, rivets, &c., may be employed to cause the clamp to tightly hold the frame of the dash or extension thereof, rivets being the least desirable means, as they prevent the ready separation of the foot from the dash when it becomes necessary to repair or replace the dash or foot.

The elasticity of spring metal may be employed to cause the clamp to tightly embrace the dash or extension thereof. Thus a clamp such as shown in Figs. 4, 15, 17, 18, 19, and 20 may be made of spring metal, and, being less curved or concave than the bar, &c., of the dash it embraces when secured in position, its elasticity will aid in securing it in place; and the elasticity of a clamp such as is shown in Figs. 1, 2, 3, 5, 6, and 7, when made of spring metal, may be taken advantage of by making the inner concavity or concavities which are to embrace the bar of the dash of less conjoint depth than the horizontal diameter of the bar, or, when the clamp is a split foot or split dash, by making the same so that the cleft is normally of less size than the end of the dash or foot to be introduced therein and held thereby. Another object of thus employing spring metal in the clamp and making use of this elasticity is, that if the clamp should bend under strain it will return to its normal position as soon as the strain is removed. The clamp can in such a case be made much lighter.

The dashes at present manufactured as an independent article of manufacture require to be provided with a bearing, usually connected to or welded to the dash-frame, for the specific object of affording a provision for the attachment of the foot.

In this connection my invention possesses this advantage, that in the manufacture of the dash no special provision is required to adapt the latter to be connected to the foot or other detachable portion of the vehicle.

My invention is adapted to hold the dash by encircling or otherwise grasping any portion of the frame-work or extension thereof and utilize the same as a bearing. For example, the lower or horizontal rod, H, or an equivalent rod, is necessarily present in the frame of a large portion of the footless dashes now made, and may be used as a bearing.

What I claim as new and of my invention is—

1. The combination of the dash-frame and clip or clamp and vehicle-body, the clip or clamp being so arranged that it holds the dash to the vehicle by grasping or encircling some portion of the dash-frame, substantially as and for the purposes specified.

2. The combination of the dash-frame and clip or clamp constructed and applied to connect the frame to a permanent or detachable portion of the vehicle, substantially as and for the purposes set forth.

3. A device for connecting a footless frame-dash to vehicles of various widths, consisting of an independent separable dash-foot and a clip or clamp and adapted to hold by encircling or otherwise grasping between them some portion of the frame of the dash or extension thereof by the aid of screws, bolts, &c., and secure the dash to the vehicle, substantially as and for the purposes specified.

4. The combination of a frame-dash and an independent separable dash-foot and a clip or clamp, substantially as and for the purposes specified.

5. The clip D, provided with shoulder or extension $e$, in combination with the bar of a dash-frame or extension and the dash-foot or vehicle-body, and a device for securing said clip D to said foot or body, substantially as and for the purposes specified.

6. The particular device herein described, and consisting of foot A B and clip D and screw-bolt E, substantially as and for the purposes set forth.

GEORGE M. PETERS.

In presence of—
T. J. JANNEY,
WM. N. COBB.